United States Patent [19]

Majerski et al.

[11] 4,156,922
[45] May 29, 1979

[54] DIGITAL SYSTEM FOR COMPUTATION OF THE VALUES OF COMPOSITE ARITHMETIC EXPRESSIONS

[75] Inventors: Stanislaw Majerski; Wladyslaw Majerski, both of Warsaw, Poland

[73] Assignee: Instytut Maszyn Matematyeznych, Warsaw, Poland

[21] Appl. No.: 873,423

[22] Filed: Jan. 27, 1978

[30] Foreign Application Priority Data

Feb. 1, 1977 [PL] Poland .................................. 195731

[51] Int. Cl.² ........................... G06F 7/54; G06F 7/36
[52] U.S. Cl. ...................................... 364/757; 364/736
[58] Field of Search ......................... 364/757, 760, 736

[56] References Cited

U.S. PATENT DOCUMENTS

| | | | |
|---|---|---|---|
| 3,115,574 | 12/1963 | Paul et al. | 364/760 |
| 3,515,344 | 6/1970 | Goldschmidt et al. | 364/786 |
| 3,761,698 | 9/1973 | Stephenson | 364/757 |

*Primary Examiner*—David H. Malzahn
*Attorney, Agent, or Firm*—Haseltine, Lake & Waters

[57] ABSTRACT

A digital system for computing of the values of composite arithmetic expressions, such as $$\sum_{i=1}^{n} \prod_{j=1}^{k_i}$$

$x_{ij}$ where $n, k_1, k_2, \ldots, k_n$ are arbitrary integers, on numbers $x_{ij}$ in a binary system for application in large computer systems, with possibility of a collision-free multitask work with several computers. The system contains a processing unit for pipeline processing of information to form the partial products for the given multiplicand and multiplier summands. These partial products are the full product summands. It also reduces gradually these summands together with the additional summands of the addition to a smaller number, preferably to two summands. The system contains also a set of registers in which the operands and the intermediate results are stored. The intermediate results in the form of pairs of reduced summands, or of several reduced summands are introduced from the outputs of the processing unit again to the inputs of this same unit, through the set of registers.

11 Claims, 2 Drawing Figures

DIGITAL SYSTEM FOR COMPUTATION OF THE VALUES OF COMPOSITE ARITHMETIC EXPRESSIONS

BACKGROUND OF THE INVENTION

The subject of the invention is a digital system for computing of the values of composite arithmetic expressions of numbers in a binary system, designed in particular for computing of the values of polynominal expressions $$\sum_{i=1}^{n} \prod_{j=1}^{k_i}$$

$x_{ij}$, especially of those with big values of n and with numbers $x_{ij}$ possessing many significant bits. The system is mainly designed for use in large computer and computers systems, especially in specialized high-speed processors for numerical computations and in other high-speed digital systems performing arithmetic operations. The system may also be used for simultaneous computations of several independent arithmetic expressions as well as for the multitask collisionfree work with several different computers In the known designs of electronic digital systems, the computation of composite arithmetic expressions usually amounts to performing successive arithmetic operations, the results of which being, in turn, the arguments of successive operations of these expressions until a final result is obtained. Fairly well known are electronic devices and digital systems for fast performance of multiplications and additions. These operations are the basic ones when computing the values of many arithmetic expressions, and particularly polynomial ones $$\sum_{i=1}^{n} \prod_{j=1}^{k_i}$$

$x_{ij}$. In this case, the speed of multiplication is most important for this operation is far more time-consuming than addition. There exist many digital systems suited to a pipeline processing of information, ensuring very high effective speed of information processing and especially very fast execution of long sequences of multiplications and additions. In previously known electronic digital systems for very fast multiplication of two binary numbers, all partial products, necessary to obtain the final product, assigned to successive groups of multiplier bits, are simultaneously added in parallel to one another. In the multiplying system of 48-bit numbers, where the individual partial products are attributed to the pairs of successive multiplier bits, 24 such products are added simultaneously. The digital system performing this operation consists of 22 carry-save adders and 1 carry propagation adder. The above mentioned adders are connected together in a multilayer cascade, containing in seven layers respectively 8, 5, 3, 2, 2, 1, 1, carry-save adders and in the 8th layer — carry propagation adder. All these adders form one switching network and do not contain storing elements. The time of performing the addition of 24 partial products in such a system of adders is the sum or the maximum time of propagation of signals through 7 one-position adders connected in series and the time of propagation through 1 carry propagation adder with approximately 90 positions; the latter adder contains complex carry-skip circuits for minimization of the maximum time of carry propagation. Partial products being added in the described set of adders represent the multiples of multiplicand shifted with respect to one another, assigned to the pairs of multiplier bits representing the integers from 0 to 3. To avoid the time-consuming determination of three-fold multiplicand, which requires an extra addition of the multiplicant and the shifted multiplicant, the presented multiplication system contains a switching network which transforms the multiplier in parallel. Output signals of this network, assigned to the successive groups of multiplier bits, represent the numbers $-2,-1,0,1,2$, instead of the numbers 0,1,2,3. In the described multiplication system, the double multiplicant is obtained by shifting the multiplicand by one bit position to the left, and the negative multiples of the multiplicand — by negating the bits of the positive multiples and the addition of correcting "one" in the least significant binary position. The multiplying system containing the described set of adders has been described in the following papers: C. S. Wallace "A Suggestion for a Fast Multiplier", The Institute of Electrical and Electronics Engineers, Transactions on Electronic Computers, volume Ec-12, pages 14–17, February 1964; T. G. Hallin, M. J. Flynn "Pipelining of Arithmetic Functions", The Institute of Electrical and Electronics Engineers, Transactions on Electronic Computers, volume EC-21, pages 880–886, August 1972; J. W. Gawrilow, A.N.Puczko "Arifmeticzeskije ustroistwa bystrodiejstwujuszczich elektronnych cifrowych wyczislitielnych maszin" /Arithmometers of Fast Electronic Computers/ — Publ. "Soviet Radio", Moscow 1970, pages 133–180; and carry, skip circuits, also named carry, look-ahead circuits, in the paper: O. L. MacSorley "High Speed Arithmetic in Binary Computers", Proceedings of the Institute of Radio Engineers, volume 49, No. 1, 1961, pages 67–91. In the previously used computers and digital systems, having the structure suited to the pipeline processing of information, the individual layers of switching networks, processing the information, are separated from each other by the layers of registers to provide gradual performing of the parts of different operations at the same time in different individual layers of the switching networks. Processing the successive information being performed in the individual layers of such computers and systems with constant frequency, depends upon the maximum delay of the layer. The pipeline processing of information has been described, among others, in the papers: M. J. Flynn "Pipelining of Arithmetic Functions", The Institute of Electrical Engineers, Transactions on Electronic Computers, volume EC-21, pages 880–886, August 1972; T. C. Chen et al. "Introduction to Computer Architecture", chapter 9, page 417, Publ. Science Research Associates, Chicago, USA, 1975.

A drawback of the known computers and digital systems, particularly those intended to perform composite computations of great accuracy, is a relatively long time of executing the individual multiplications and additions. Even in the case of very fast adders, a considerably part of this time is consumed by the carry propagation. The carry propagation time, being the time of delay in numerous operations performed while computing of composite arithmetic expressions, has a considerable influence upon the total time of computation.

The aim of the present invention is to remove this drawback and to eliminate, as much as possible, all such information processing, including which have a character of series processes, carry propagation processes, which the end operations of multiplication and addition.

SUMMARY OF THE INVENTION

This aim has been achieved by the application of a logical structure of the digital system, which enables the pipeline processing of information only at the initial and medium stage of the individual multiplications and additions, appearing in the computed arithmetic expressions, and by application of unfinished results of these operations as operands of the successive operations multiplications and additions, appearing in those computations. This leads in consequence to almost full elimination of time-consuming carry propagation processes which usually are the final stage of multiplications and additions.

A digital system for computation of the values of composite arithmetic expressions, according to the invention, is dessigned for computation of the values of polynominals of an arbitrary degree of one or several variables, function series, scalar products and of the other computations on vectorized data for vectors of a large number of components, where the operands and results of computations are numbers presented in a binary system, usually in the complementary one, or the form of sign-magnitude done, with the fixed- or floating-point. The digital system comprises a digital processing unit used to form partial products, preferably in the multiplicand of multicand multiples shifted with respect to each other, which are the summands of a full product of a number by a sum of numbers, and to reduce the number of these summands and the summands which are introduced additionally to the processing unit, to a smaller number of summands the total sum being unchanged. The digital system comprises also a set of parallel registers used to store the operands introduced from the outside of the system to the system, which will be introduced to the processing unit, and to store the intermediate results, introduced to the register set from the processing unit and which will be introduced again to the processing unit. Here the parallel register is an arbitrary digital circuit to which the signals representing bits of a single binary number are simultaneously introduced, so that they may be stored there, and then removed from it simultaneously during the period of time required to perform the given task. The register set contains at least two parallel first registers storing reduced summands as multiplier summands, and at least two parallel second registers storing reduced summands for the successive adding to other operands or intermediate results. Parallel first registers used for storing the multiplier summands, together with the processing unit form the parallel information loops, through which the intermediate results in the form of two or more reduced summands, obtained at the processing unit outputs, are again introduced to the inputs of the processing unit as the summands of the multiplier which is one of the two operands for the successive multiplication. The above mentioned first registers storing the multiplier summands serve also for introducing the multiplier or multiplier summands from outside the system to the processing unit. The second registers and the processing unit form the separate parallel information loops, through which the intermediate results in the form of two or more reduced summands, obtained at the processing unit outputs, are again introduced to the ijnuts of processing units, as the summands for the successive additions. Through these second registers, or separate parallel registers of register set, the additional summands for the successive additions are also introduced from the outside of the system to the processing unit. Of advantage is the application of the processing unit reducing the number of all summands to two, their total sum being unchanged, and the application of two registers storing the multiplier summands, as well as the application of two registers storing the reduced summands for addition, or several pairs of registers storing several pairs reduced summands, for several independent intermediate results. The logic structure of a processing unit is adjusted for a simultaneous forming of many or all partial products being the summands of full product of two operands; the first operand is the multiplicand which is introduced in parallel to the processing unit from the multiplicand register, and the second operand is the multiplier composed of two or more multiplier summands being introduced simultaneously to the processing unit from the registers storing multiplier summands. The formation of the above mentioned partial products is performed parallelly without execution of the effective addition of multiplier summands, it means without carry propagation along the multiplier summands, preferably as in the patent application: Method for binary multiplication of a number by a sum of two numbers and a digital system for implementation thereof, U.S. Patent Application Ser. No. 802,187. Here, the digital system for computation of the composed arithmetic expressions, being the subject of the present invention can be a separate construction module, as well as a set of several circuits connected together, which form more than one module or are the parts of one module.

To increase the efficiency of the digital system according to this invention, the processing unit has a layer structure with layers containing the switching networks, separated by the layers containing parallel registers. The layers of the switching networks of the processing are adjusted to the parallel processing informations, that is they are built in such a way, that the maximum number of their logical elements, through which the information signals propagate in series, does not depend upon the number of bits of the binary numbers being processed. This maximum number of logical elements is small and preferably equals from 2 to 8 simple logical elements. The separating layers of parallel registers enable independent, gradual, pipeline processing of information in the successive layers of the switching networks of the processing unit. The successive layers of the switching networks have a logical structure adjusted to form the partial products, preferably in the form of multiplicand multiples shifted in relation to each other, these being the summands of a full product of a number by a sum of numbers, and then to reduce gradually the above mentioned product summands, together with the summands introduced additionally to the processing unit, to a smaller number of summands, preferably to two summands, their total sum being unchanged. The system operates synchronously with a determined frequency, adjusted to the logical structure of the processing unit and to the operating speed of its logical elements. This frequency depends upon the maximum delay introduced by one layer containing the switching networks and one layer containing the registers of the processing unit together. With this very frequency, the reduced summands are introduced simultaneously to all layers of registers of the processing unit from the preceding layers of the switching networks of this unit. In other words, the pipeline processing of information is performed in the successive layers containing the switching networks of the processing unit.

In particular, the processing unit has a logical structure adjusted to reduce the number of summands to two, with their total sum being unchanged the layer of switching networks of this unit, used to form the partial products permits a parallel forming of all partial products of a full product of a number by a sum of two numbers, that is, of a full product of multiplicand by two summands of multiplier. These partial products are, either shifted with respect to each other multiplicand multiples expressed by numbers $-1, 0, +1$, where each multiplicand multiples is assigned to one pair of bits corresponding to another taken from two multiplier summands, or shifted with respect to each other multiplicand multiples expressed by numbers $-2, -1, 0, +1, +2$, where each multiplicand multiple is assigned to one pair of two-bit groups of bits taken from two multiplier summands, of advantage here is the the method according to the patent application: Method for binary multiplication of a number by a sum of two numbers and a digital system for implementation thereof, U.S. Pat. Application Ser. No. 802,187. This method permits formation of the correct multiple of multiplicand for each partial product assigned to a single pair of bits, taken from both multiplier summands, on the basis of this pair of bits, and eventually of the sign bits of both multiplier summands, and for each partial product assigned to the single pair of two-bit groups of bits, taken from both multiplier summands, on the basis of a pair of five-bit groups of bits and, eventually of the sign bits of both multiplier summands. In case of a binary complementary system, the sign bits are necessary only for determining the partial product assigned to the sign position of the multiplier, or assigned to the group of positions containing the sign position. Multiplicand multiples corresponding to the numbers $-2, -1, 0, +1, +2$ are obtained from the single multiplicand in such a way, that the doubled multiplicand is obtained by shifting the multiplicand by one position to the left, and negative multiples — by negating the bits of positive multiples and adding the correcting "one" at the least significant position.

In particular, the layers of the switching networks of the processing unit, designed to reduce gradually the partial products formed in this unit and intended for adding the summands introduced to this unit, to a smaller number of summands their total sum being unchanged, consist of coders having p one-bit inputs and r one-bit outputs; such coders provide a zero-one signal combination of r coder outputs which represents a binary coded sum of "ones" being represented by zero-one signals at the p inputs of the coder. In particular, the layers of these switching networks of the processing unit are composed of coders with 8 or 9 inputs and 4 outputs, having weights of the output bits equal to 4,2,2,1, or 8,4,2,1, or of coders having 7,6,5 or 4 inputs and 3 outputs, with weights of output bits 4,2,1, as well as of coders having 3 inputs and 2 outputs, with weights of the output bits 2,1, that is, in the last case, of one-position binary adders. The individual layers of the switching networks of the processing unit usually consist usually of one, two, three or four layers of such coders, which are not connected to each other within one layer of coders. A single series of such p input and r output coders, being not connected to one another, reduces, in parallel connection, p summands to r summands, presented in binary system, their total sum being unchanged. Of advantage application of coders with 3 inputs and 2 outputs, that is one-position adders, in the layers of the switching networks of the processing unit. One series of such one-position adders, not connected to each other, being one multi-position binary carry-save adder, reduces three summands represented in binary fashion to two summands, their total sum being unchanged.

The digital system according to the invention, includes in particular, a parallel adder designed for adding the summands reduced in the processing unit. This adder is connected to the outputs of the processing unit, or to the outputs of registers of the register set. When the processing unit reduces the number of summands to two, this adder is a two-summand one, and in case of a greater number of the reduced summands obtained at the outputs of this unit, the adder is adjusted to a greater number of summands. Of advantage is the application of an adder possessing a layer structure, with layers containing the switching networks, separated by layers of registers; this adder is adjusted to pipeline execution of successive additions, these being synchronized with a pipeline processing of information in the processing unit. The application of an adder to the system is aimed at obtaining the final result of computation in the form of one number in the required binary system.

The output of the adder adjusted to pipeline processing of information or, more precisely, to pipeline execution of successive additions, is connected, in particular, through a multiplicand register of the register set, with a parallel input of the processing unit, this input being designed for the introduction of multiplicand. This permits such multiplications occurring in arithmetic expressions, where both multiplication operands are the sums of two or more summands.

It is beneficial if in the digital system according to the invention, the loops, through which the intermediate results, obtained at the outputs of the processing unit are introduced again at its inputs, comprise two parallel registers of the register set, where the reduced summands for addition are stored, and comprise only one last layer of switching networks of the processing unit. The above-mentioned intermediate results, in the form of pairs of reduced summands, are again reduced together with the other summands in the last layer of the processing unit, to two summands, their total sum being unchanged. Application of the loops, containing only one layer of the switching networks of the processing unit, permits computation of the values of polynomials $$\sum_{i=1}^{n} \prod_{j=1}^{k_i}$$

$x_{ij}$ for the large values n with such a speed, that the average multiplication time is only slightly longer than the time of one cycle of pipeline processing in one layer of the processing unit, and the additions, occurring in the polynomials, in most cases do not influence the total time of computation.

In particular the system according to the invention, contains several pairs of parallel registers, in which the intermediate results, introduced from the processing unit, in the form of pairs of the addition summands, are stored. From each of the pair of these registers, the pair of summands can be introduced again to the processing unit, or to the pair of the parallel registers of multiplier summands. Introduction of these summands to the multiplier summand registers is performed either directly, or through one or several layers of the processing unit, wherein these summands together with other summands are reduced, their total sum being unchanged. Simultaneous storage of several intermediate results in the form of pairs of reduced summands, and their introduction again to the processing unit, and/or to the multiplier summand registers, enables computation of several polynomial expressions with various locations of parentheses.

The system according to the invention is also such a system, where each loop, formed by the processing unit and some registers of the register set, comprises k layers of parallel registers and of single parallel registers together, being connected in series, through which the pipeline processed information is transmitted successively, to enable an simultaneous, independent computation of k arithmetic expressions. The time of information circulation in each loop formed by the processing unit and some registers of a register set, is k times longer, than the time of a pipeline processing in one layer containing switching networks in the processing unit. The choice of the number k depends mainly on the number of layers of the switching networks of the processing unit. In case the information processing occurs in the processing unit only, the prefered number k is equal to the number of layers of the switching networks in this unit. Arithmetic expressions being computed in the digital system may belong either to one problem, being solved by one program, or to several various problems, being solved in a collision-free manner, when this digital system cooperates with k different computers, performing separate independent programs. One of the aims of the latter application of the digital system is decreasing the speed of computation of each of k arithmetic expressions, alleviating the requirements for the speed of memories cooperating with this digital system.

The digital system according to the invention comprises, in particular, a parallel adder adjusted to a pipeline performance of the successive additons. This adder, the processing unit, and some registers of the register set jointly form an additional loop. This loop contains 2k layers of parallel registers and of single parallel registers, through which the pipeline processing of information is performed successively. Information circulation time in this additional loop is twice as long as in the other loops of the digital system. It is advantageous when this loop also contains the multiplicand register of the register set. This permits multiplication, when both arguments are the sums of two or more summands. In case of large enough number of registers storing the reduced summands, such a solution permits computation of the values of expressions with an arbitrary location of parentheses.

The operation of the digital system wherein the processing unit, containing the layers of the switching networks, separated with the layers of registers, reduces the total number of summands to two, and wherein these both reduced summands of final result are added in an adder connected to the outputs of the processing unit, is described below.

The digital system operates synchronously with a frequency, permitting a pipeline processing of information in the successive layers of the switching networks of the processing unit. With identical frequency, the operands of the arithmetic expression being computed, namely operands of its products and sums, are introduced at the set inputs of the system, in the sequence which depends on the form of this expression. Computation of the product of the two operands requires a simultaneous introduction of multiplicand and multiplier to the inputs of this layer of the switching networks of the processing unit, wherein the partial products being the summands of the full product are formed in parallel. A multiplicand is introduced to the processing unit through the register of multiplicand, and a multipler — is introduced through one of the registers of multiplier summands. In the mentioned layer of the processing unit, multiplication is replaced by addition of many summands being partial products of the full product being computed. A synchronous introduction of the additional summands for adding to this product only increases the total number of summands being reduced in processing unit. In the successive layers of the processing unit the number of summands is gradually reduced, their total sum being unchanged. The summands of the computed product, reduced in the processing unit to two summands, are next introduced either to registers storing the reduced summands, if they ought to be added to the other operands of the expression being computed, or to the registers storing the multiplier summands, if their sum ought to be multiplied by the successive operand. In the last case, this successive operand of multiplication is introduced to the processing unit as multiplicand simultaneously with the multiplier summands, stored in their registers. As result of this operation of the processing unit, two reduced summands of the successive intermediate result are obtained on its outputs. They are introduced again, either to the registers storing the reduced summands, or to the registers storing the multiplier summands, depending on whether their sum ought to be added to other operands of the arithmetic expression, or whether it ought to be multiplied by its other operands. When the computed intermediate result ought to be added to the content of the registers storing the reduced summands, the content of these registers is introduced to the processing unit during the reduction therein of the number of the summands of this intermediate result. The value of the whole computed arithmetic expression is also obtained in the form of two summands at the outputs of the processing unit. After addition of these summands in the adder, the final result of computation is obtained at its output. The described method of computation of the value of a polynomial, or a polynomial expression with parentheses, requires only execution of one effective full addition with carry propagation.

The main advantage of the digital system, which is the subject of the invention, is its very high operating speed, obtained due to the application of the pipeline processing of information only at the initial and intermediate phases of execution of multiplications and additions, as well as making use of these unfinished results, in a form of groups of several summands, most often pairs of summands, as the operands of the next multiplications and additions. Owing to this, the time-consuming carry propagation processes, being usually the final phase of the multiplications and additions, have been almost fully eliminated in the digital system. In consequence, the computation of the values of composite arithmetic expressions in this digital system is performed without carry propagation along the processed operands, if the final result of this computation is in the form of two summands, or it requires only one process of carry propagation during the last addition of two summands, if the final result is in the form of one number in a required binary system, for example in the complementary one, or in the form sign-magnitude.

BRIEF DESCRIPTION OF THE DRAWINGS

The invention will be presented by two examples of embodiment shown in FIGS. 1 and 2, in which.

DESCRIPTION OF THE PREFERRED EMBODIMENTS

EXAMPLE I

Figure 1:
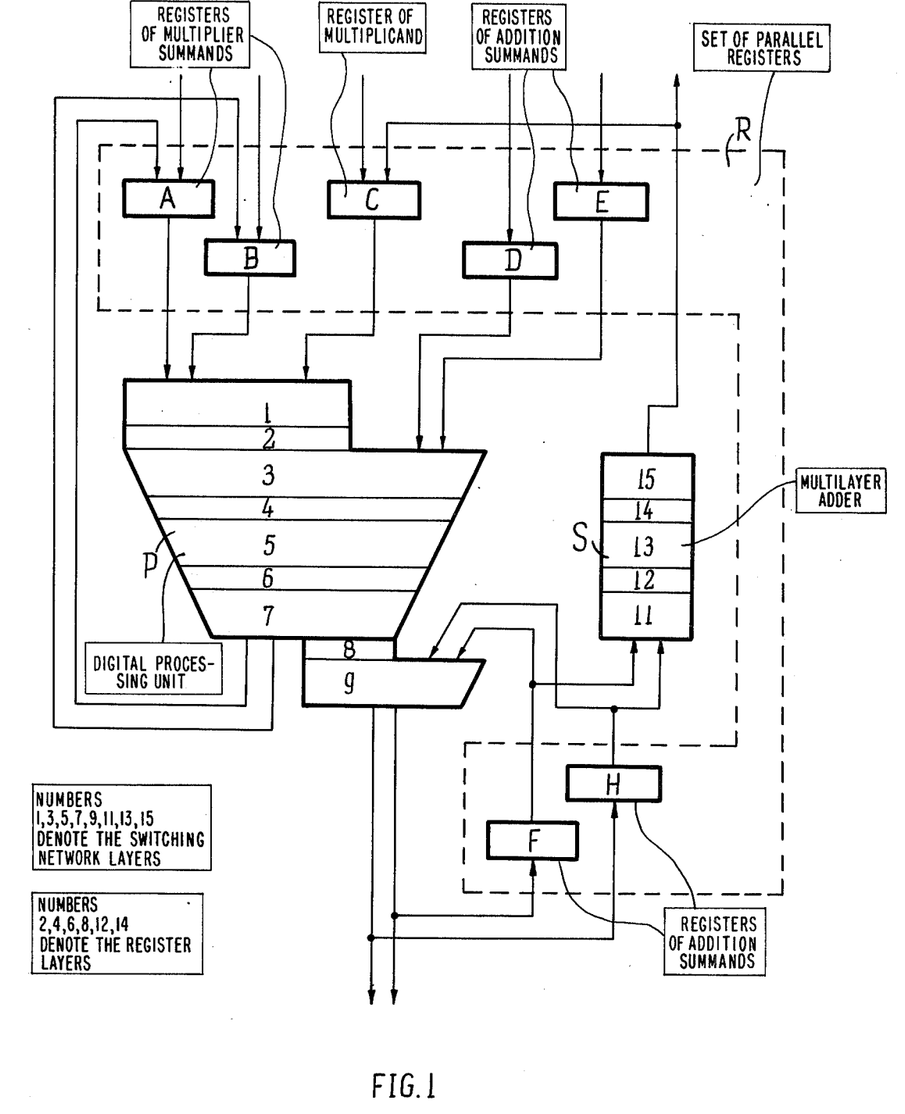
FIG. 1 shows a block diagram of the diagram of the digital system described in example I.

The digital system presented in FIG. 1 contains a processing unit P, two parallel registers A and B storing the multiplier summands, parallel multiplaced register C, two registers D and E storing the addition operands, two parallel registers F and H storing the summands reduced in the processing unit P, as well as a parallel adder S. The processing unit P has five layers 1,3,5,7, and 9 containing the switching networks, separated by four layers 2,4,6 and 8, containing parallel registers. Adder S is a two-summand parallel adder with layer structure, having three layers 11,13 and 15 containing the switching networks, separated from one another by two layers 12 and 14 of parallel registers. All registers of the system that is both, the registers A,B,C,D,E,F,H, as well as the registers which form the layers 4,6,8,12,14, are double registers of a master-slave type, suited to pipeline information processing in the system. The control signals introduced room the outside of the system cause the storage of the zero-one signals supplied at the inputs of the above mentioned registers. To the processing unit P the operands are introduced from the outside, through registers A,B,C,D,E. Registers A and B and the processing unit P together forming the parallel loops, through which the intermediate results, obtained at outputs of layer 7 of the processing unit P, in the form of pairs of the reduced summands, are introduced again, as pairs of multiplier summands, to the processing unit P at the inputs of layer 1. Registers F and H and the processing unit P form parallel loops too. The intermediate results obtained at the outputs of layer 9 of the processing unit P are introduced again through these registers to the inputs of layer 9 as pairs of summands, being next added to the next summands reduced in the processing unit P. The outputs of registers F and H are also connected with the inputs of adder S, where the addition of the two summands of a final result takes place, these summands are introduced at the inputs of adder S from the processing unit P through the above mentioned registers F and H. The output of the adder S is a parallel external output of the entire digital system. Each of the inputs and outputs of the specified registers, of the processing unit P and of the adder S is adjusted to a parallel introducing or leading out of all bits of one binary number. The system is adjusted to the computation on 32-bit numbers. In the successive layers 1,3,5,7 and 9 of the processing unit P, containing the switching networks, the pipeline processing of information is performed, namely: preparation of the partial products in layer 1 and a gradual reduction of a number of summands in layers 3,5,7 and 9. The layer 1 of the processing unit P consists of many simple switching networks, at the outputs of which all bits of 17 partial products are obtained simultaneously; these partial products being the summands of the product of 32-bit multiplicand and of multiplier composed of two 32-bit summands. The individual partial products are assigned to the pairs of binary positions of multiplier and represent, shifted with respect to each other, the multiples of multiplicand corresponding to the numbers $-2, +1, 0, +1+2$. Each of the layers 3,5,7,9 consists of two layers of one-position adders; every adder had three one-bit inputs and two one-bit outputs, which are not directly connected one to another within a single layer of adders. These adders form the series, each series reduces three summands to two, their total sum being unchanged. In particular, layer 3 consists of two layers of one-position adders containing correspondingly 0 and 4 series of adders; layer 5 consists of 3 and 2 series of such adders, and each of layers 7 and 9 consists of two single series of one-position adders. Layer 3 reduces 17 partial products plus 2 addition summands to 9 summands with identical sum, layer 5 reduces the number of summands from 9 to 4, and each of the layers 7 and 9 reduces the number of summands from 4 to 2. Layers 1,3,5,7 and 9 are separated from one another by layers 2,4,6 and 8 containing successively 17,9,4 and 2 parallel registers, whether 17 partial products and 9,4 and 2 reduced summands are successively stored.

The operation of the digital system shown in FIG. 1 will be presented on an example of computation of an arithmetic expression $$\sum_{i=1}^{100}$$

$[(x_iy_iz_i+w_i)v_i+u_it_i+p_i+q_i+r_i+s_i]$, which requires execution of 400 multiplications and 699 additions. The time of computation of the value of the presented expression consists of the time of 400-fold transit of the information signals through a single layer of the switching networks and a single layer of registers, plus the time of a single transit of the information signals through all layers of the processing unit P and adder S. If a period of time of pipeline processing of information in one layer is assumed to be the unit of time T, this time being equal in the described system to the maximum transit time of information through two one-position adders connected in series and through one parallel register of the master-slave type, then the time of computation of the value of the above mentioned expression will be equal $400T+5T+3T=408T$. Computing procedure is as follows. Pairs of product operands $x_1,y_1$; $x_2,y_2$; $x_3,y_3$; $x_4,y_4$ are supplied to the inputs of layer 1 of processing unit P through registers A,C in the four successive periods T designated by $T_1, T_2, T_3, T_4$. The pairs of summands of products $x_1y_1$; $x_2y_2$, $x_3y_3$, $x_4y_4$, obtained successively at the outputs of layer 7 of the processing unit P, resulting from the operation of the processing unit, are introduced again in periods $T_5, T_6, T_7, T_8$, as the pairs of multiplier summands, through registers A,B, to the inputs of layer 1 of unit P. At the same time, there are introduced successively through register C the numbers $z_1, z_2, z_3, z_4$ as the successive multiplicands, and after a delay equal to one period of T successively the numbers $w_1, w_2, w_3, w_4$ as the added summands, these last ones are introduced through register D to the inputs of layer 3 of the unit P. As a result of operation of processing unit P, at the outputs of its layer 7 there are obtained successively the pairs of the summands representing the intermediate results $x_1y_1z_1+w_1$, $x_2y_2z_2+w_2$, $x_3y_3z_3+w_3$, $x_4y_4z_4+w_4$. These pairs of summands are introduced again to the inputs of the layer 1 of the processing unit P at the periods $T_9$, $T_{10}$, $T_{11}$, $T_{12}$ through registers A,B as the multiplier summands. At the same time there are also supplied through the register C the numbers $v_1$, $v_2$, $v_3$, $v_4$ as the multiplicands, and after a delay equal to one period T there are successively introduced to the processing unit P through the registers D, E the pairs of numbers $p_1$, $q_1$; $p_2$, $q_2$; $p_3$, $q_3$; $p_4$, $q_4$ as the added summands. As a result of the operation of processing unit P at the outputs of its layer 7 there are obtained successively the pairs of summands of the intermediate results $(x_iy_iz_i+w_iv_i+p_i+q_i$ for $i=1,2,3,4$. These pairs of summands are introduced successively to layers 8 and 9 of processing unit P in periods $t_{13}$, $T_{14}$, $T_{15}$ and $T_{16}$, and therefrom to registers F, H. To layer 9 there are introduced simultaneously in the periods $T_{14}$, $T_{15}$, $T_{16}$, the contents of registers F, H. As a result of this operation, in registers F, H in period $T_{17}$ there are obtained two summands of a sum $$\sum_{i=1}^{4}$$

$[(x_iy_iz_i+w_i)v_i+p_i+q_i]$. Independently of this, the pairs of product operands $u_1$, $t_1$; $u_2$, $t_2$; $u_3$, $t_3$; $u_4$, $t_4$, are introduced in periods $T_{13}$, $T_{14}$, $T_{15}$, $T_{16}$ successively, to the inputs of layer 1 of processing unit P, through registers A and C, and after a delay equal to one period T, the pairs of added summands $r_1$, $s_1$; $r_2$, $s_2$; $r_3$, $s_3$; $r_4$, $s_4$ are introduced through registers D, E to the inputs of layer 3 of processing unit P. As a result of the operation of the processing unit P, there are obtained at the outputs of its layer 7 the pairs of the summands representing intermediate results $u_it_i+r_i+s_i$, successively for $i=1,2,3,4$. These pairs of summands are supplied successively to layers 8 and 9 of processing unit P in periods $T_{17}$, $T_{18}$, $T_{19}$ and $T_{20}$ and therefrom to registers F, H, whereas the successive contents of the registers F, H are introduced simultaneously to layer 9 in the periods $T_{17}$, $T_{18}$, $T_{19}$ and $T_{20}$. As a result of this, two summands in the registers F, H in the period $T_{21}$ are obtained giving the sum equal to $$\sum_{i=1}^{4}$$

$[(x_iy_iz_i+w_i)v_i+u_it_i+p_i+q_i+r_i+s_i]$. In a similar way, by supplying to processing unit P, in the periods from $T_{17}$ up to $T_{32}$, further operands from $x_i$ to $s_i$ for $i=5,6,7,8$ there are obtained in registers F, H in the period $T_{37}$ two summands of the sum $$\sum_{i=1}^{8}$$

$[(x_iy_is_i+w_i)v_i+u_it_i+p_i+q_i+r_i+s_i]$. Similarly, two summands of the final result $$\sum_{i=1}^{100}$$

$[(x_iy_iz_i+w_i)v_i+v_it_i+p_i+q_i+r_i+s_i]$ are obtained in registers F, H in the period $T_{405}$. After adding of these two summands in adder S, containing 3 layers of switching networks 11,13 and 15, the final result in the form of one number in the required binary system at the output of the adder S is obtained in the period $T_{408}$.

Figure 2:
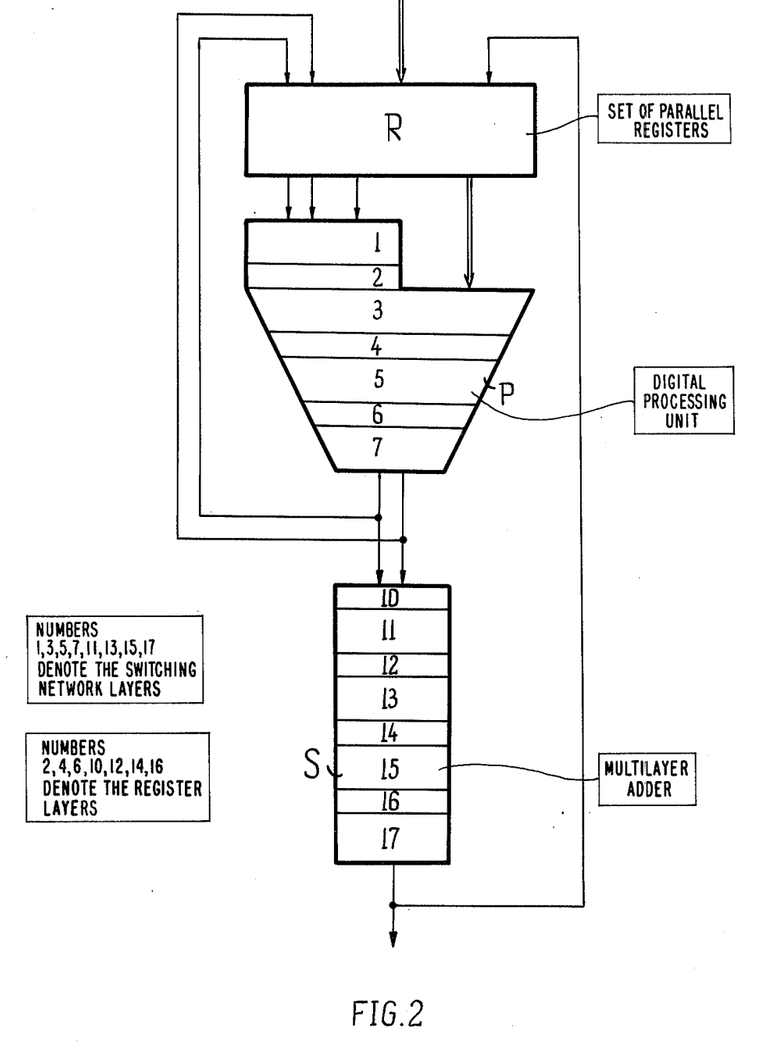
FIG. 2 shows a block diagram of the digital system described in example II.

Example II. The digital system presented in FIG. 2 is suited to the simultaneous, independent computation of four arithmetic expressions. The system contains processing unit P, the set of parallel registers R and a parallel adder S. The processing unit P has four layers 1,3,5 and 7 containing the switching networks, separated by three layers 2,4 and 6 containing the parallel registers. The set of parallel registers R contains two registers where the multiplier summands are stored, the multiplicand register, and two layers of registers storing reduced summands for addition. Adder S is a two-summand parallel adder of a layer structure, possessing four layers 11,13,15 and 17, containing the switching networks, separated with three layers 12,14 and 16 containing the parallel registers. Similarly as in the previously described digital system, all registers of the system are suited to pipeline processing of information. The processing unit P is built in a similar way, as far as seven layers 1,2,3,4,5,6,7, of the processing unit of the system described in the first example of embodiment are concerned. The system has connections permitting parallel transmitting of intermediate results, in the form of the pairs of the reduced summands, from the outputs of layer 7 of processing unit P to the registers storing the multiplier summands and to the first layer of registers storing the reduced summands of registers set R, as well as the connections permitting transmitting of these intermediate results and the final result from the outputs of layer 7 of processing unit P to adder S. From adder S, the intermediate results are transmitted to the multiplicand register in the set of registers R, and the final result — to the outside of the system. Operands from the outside of the system are introduced to the parallel registers of the set of registers R. From the multiplicand register and from the registers of the multiplier summands, in register set R, the operands, as well as the intermediate results, are introduced to the inputs of layer 1 of processing unit P, and from the registers of register set R, which store the operands and reduced summands for adding, through registers of the second layer of register set R, to the inputs of layer 3 of processing unit P. The second layer of registers, storing the reduced summands in register set R is thus a buffer layer, introducing a delay equal to the delay of one layer of pipeline processing of information in processing unit P.

The operation of the digital system shown in FIG. 2 will be presented on an example of simultaneous computation of four independent arithmetic expressions, one of which is the same as in the example I, the expression $$\sum_{i=1}^{100}$$

$[(x_iy_iz_i+w_i)v_i+u_it_i+p_i+q_i+r_i+s_i]$, which requires execution of 400 multiplications and 699 additions. The time of computation of the value of this expression consists of time of 400 circulations of information signals in the loop, comprising all layers of processing unit P, and of the time of a single transit of the information signals through all layers of processing unit P and adder S. Assuming that the unit of time is the previously defined period T, we obtain the time of computation of the given above expression $400+4T+4T+4T= 1608T$. The operands of the computed expression are introduced to processing unit P every fourth period T. Thus, in each period T only one layer of the switching networks of the processing unit P is used for the computation of this expression in a pipeline way. The remaining layers of the switching networks of processing unit P can be used similarly for simultaneous pipeline computing of the three other independent arithmetic expressions. These expressions may belong, for example, to various problems solved collision-free, in case of cooperation of the described digital system with several computers. Taking into account a fact that, in the described embodiment of the digital system, the successive groups of operands are introduced to processing unit P periodically, every fourth period T, that is, with the frequency corresponding to the full operation cycle of unit P, the individual operands may be introduced in the sequence of their indices, that is successively for $i = 1,2,3,...$ This simplifies the control of the input information stream as compared with the system presented in example I. The average speed of execution of arithmetic operations in both embodiments of the digital system corresponds approximately to one multiplication perei period T. Additions occuring in the arithmetic expressions do not influence the computation time of these expressions. This estimation does not hold in a case of much greater number of additions than multiplications.

2. List of reference marks to the drawings

A, B—parallel registers storing the multiplier summands

C—multiplicand register

D, E—parallel registers storing the addition operands

F, H—parallel registers storing the reduced summands

P—processing unit

R—set of registers

S—parallel adder 1, 3, 5, 7, 9—layers containing the switching networks of the unit P 2, 4, 6, 8—layers containing the parallel registers of the unit P 10—layer of the registers storing the reduced summands 11, 13, 15, 17—layers containing the switching networks of the adder S 12, 14, 16—layer containing the parallel registers of the adder S

We claim:

1. Digital system for computing values of composite arithmetic expressions, used for computation of values of polynomials of an arbitrary degree of one and many variables, function series, scalar products and other computations on vectorized data, performed on numbers presented in a binary form, said digital system comprising: a processing unit to form in parallel simultaneously many partial products as summands of a full product of two operands, the first operand being the multiplicand and the second operand being the multiplier composed of at least two multiplier summands, said partial products being formed without execution of effective addition of said multiplier summands, as well as to reduce said summands of the full product, and other summands being introduced to said processing unit for addition, to a smaller number of summands, the total sum of all said summands being unchanged, a set of parallel registers to store operands and intermediate results, said register set containing parallel first registers to store multiplier summands, and parallel second registers to store addition summands; said processing unit having independent parallel inputs to introduce the multiplicand, the multiplier summands, and summands for addition, as well as parallel outputs to obtain the output summands after reduction of their number, said reduced summands being intermediate results to use in further computation; said processing unit outputs being connected in parallel with the inputs of said parallel first registers, and output of said registers being connected in parallel with the multiplier summand inputs of said processing unit, to form together at least two parallel loops through which said reduced summands obtained at the outputs of said processing unit are simultaneously introduced as intermediate results again to the inputs of said processing unit; said processing unit outputs being also connected in parallel with the inputs of the said parallel second registers, and outputs of said second registers being connected with processing unit inputs of said summands for addition, to form together at least two other parallel loops, through which said reduced summands are simultaneously introduced as intermediate results again to said inputs of said processing unit.

2. The digital system as defined in claim 1, wherein said processing unit has a layer structure of layers containing switching networks separated by layers containing parallel registers to enable an independent step-by-step pipeline processing of information in successive layers of said switching networks; said network layers having a logical structure adjusted to form said partial products as the summands of said full product of one operand by a sum of operands, and then to reduce step-by-step said product summands and addition summands introduced additonally to said processing unit, to a smaller number of summands, their total sum being unchanged.

3. The digital system as defined in claim 2, wherein said processing unit has a logical structure adjusted to reduce the number of summands to two, tneir total sum being unchanged; a first layer of switching networks of said processing unit being used to form simultaneously all partial products of full product of a number by a sum of two numbers; said partial products being the multiplicand multiplex expressed by numbers $-1, 0, +1$, shifted with respect to each other, each of which is assigned to one pair of bits taken from said two multiplier summands.

4. The digital system as defined in claim 2, wherein said processing unit has a logical structure adjusted to reduce the number of summands to two, their total sum being unchanged; a first layer of switching networks of said processing unit being used to form simultaneously all partial products of full product of a number by a sum of two numbers; said partial products being the multiplicand multiples expressed by numbers $-2, -1, 0, +1, +2$, shifted with respect to each other, each of which is assigned to one pair of two-bit groups of bits taken from said multiplier summands.

5. The digital system as defined in claim 2, wherein said reducing network layers of said processing unit consist of coders having p one-bit inputs and r one-bit outputs each, such that a zero-one signal combination of r coder outputs represents a binary coded sum of "ones" being represented by zero-one signals at p coder inputs, where $3 < p < 9$ and $2 < r < 4$; wherein individual reducing layer of said switching networks of said processing unit is composed of 1 to 4 layers of such coders, not connected to each other within one layer of coders; and wherein a single series of the coders not connected to each other, each of the said coders having p inputs and r outputs, reduces in parallel p summands to r summands represented in a binary system, with their total sum being unchanged.

6. The digital system as defined in claim 2, wherein a parallel adder, for addition of the reduced summands obtained at the outputs of the processing unit is connected to outputs of the processing unit either immediately or through registers belonging to said register set; said adder having a lyaer structure of layers adjusted to pipeline execution of the successive additions synchronously with pipeline processing of information in said processing unit.

7. The digital system as defined in claim 6, including a parallel multiplicand register contained in said set of parallel registers; the outputs of said adder being connected with the input of said processing unit through a multiplicand register of said register set.

8. The digital system as defined in claim 2, wherein loops comprising said parallel second registers of said register set comprise only one last reducing network layer of said processing unit.

9. The digital system as defined in claim 2, wherein said processing unit has a logical structure adjusted to reduce the number of summands to two, their total sum being unchanged; and wherein said register set includes additionally 3 to 6 pairs of parallel third registers to store an intermediate result in the form of a pair of reduced summands; each of said pairs of parallel third registers having parallel inputs adjusted to introduce a pair of reduced summands from said processing unit outputs and having parallel outputs adjusted to introduce said stored pair of reduced summmands to the inputs of said first parallel registers for multiplier summands, or to said addition summand inputs of said processing unit.

10. The digital system as defined in claim 2, wherein each of the said loops formed by said processing unit and said parallel first registers and each of said loops formed by said processing unit and said parallel second registers comprises the same number k of register layers belonging to said processing unit and to said register set together, to obtain the same information circulation time, allowing simultaneous independent pipeline computations of k arithmetic expressions; the same number k of registers layers in all said loops being obtained by introducing additional registers to said parallel second registers in said register set.

11. The digital system as defined in claim 10, wherein an additional loop for information circulation of 2k register layers is applied; said additional loop being formed by connecting successively the outputs with the inputs of the following circuits:
—said processing unit,
—a parallel adder adjusted to pipeline execution of successive additions,
—a parallel register of multiplicands belonging to said register set;
—additional registers in the register set to obtain together 2k layers of registers in said additional loop.

* * * * *